United States Patent
Panchapakesan et al.

(10) Patent No.: US 10,135,684 B2
(45) Date of Patent: Nov. 20, 2018

(54) DIFFERENTIAL STAGING OF DEVICES IN BULK ENROLLMENT

(71) Applicant: AIRWATCH LLC, Atlanta, GA (US)

(72) Inventors: Ramani Panchapakesan, Bangalore (IN); Gangadhar Nittala, Bangalore (IN); Nandish Shetty, Bangalore (IN); Neelima Bojja, Bangalore (IN)

(73) Assignee: AirWatch LLC, Atlanta, GA (US)

( * ) Notice: Subject to any disclaimer, the term of this patent is extended or adjusted under 35 U.S.C. 154(b) by 349 days.

(21) Appl. No.: 14/863,464

(22) Filed: Sep. 24, 2015

(65) Prior Publication Data
US 2017/0041188 A1 Feb. 9, 2017

(30) Foreign Application Priority Data

Aug. 6, 2015 (IN) .......................... 4101/CHE/2015

(51) Int. Cl.
*H04L 12/24* (2006.01)
(52) U.S. Cl.
CPC ........ *H04L 41/084* (2013.01); *H04L 41/0809* (2013.01)
(58) Field of Classification Search
CPC ............... H04L 41/084; H04L 41/0806; H04L 41/0809; H04L 41/085; H04L 41/0859
USPC .......................................................... 709/220
See application file for complete search history.

(56) References Cited

U.S. PATENT DOCUMENTS

| 6,088,044 | A  | * | 7/2000  | Kwok    | ...................... | G06F 9/50    |
|           |    |   |         |         |                        | 345/504      |
| 2002/0032765 | A1 | * | 3/2002 | Pezzutti | ................ | H04L 41/065  |
|           |    |   |         |         |                        | 709/223      |
| 2003/0023781 | A1 | * | 1/2003 | Benhase  | ............... | G06F 13/387  |
|           |    |   |         |         |                        | 710/22       |
| 2003/0163275 | A1 | * | 8/2003 | Farrell  | ................... | G03G 15/55   |
|           |    |   |         |         |                        | 702/127      |
| 2005/0182938 | A1 | * | 8/2005 | Seshadri | ............. | G06Q 10/107  |
|           |    |   |         |         |                        | 713/176      |
| 2008/0120586 | A1 | * | 5/2008 | Hoerold  | ............. | G06F 17/5068 |
|           |    |   |         |         |                        | 716/52       |
| 2008/0226264 | A1 | * | 9/2008 | Asada    | .................. | G11B 27/034  |
|           |    |   |         |         |                        | 386/292      |
| 2008/0271118 | A1 | * | 10/2008 | Greenlaw | .......... | H04L 63/1458 |
|           |    |   |         |         |                        | 726/3        |
| 2009/0228868 | A1 | * | 9/2009 | Drukman  | ............ | G06F 9/44505 |
|           |    |   |         |         |                        | 717/121      |

(Continued)

Primary Examiner — Kevin T Bates
Assistant Examiner — Chen-Liang Huang
(74) Attorney, Agent, or Firm — Thomas | Horstemeyer, LLP

(57) ABSTRACT

Disclosed are various examples for differential staging of devices in bulk enrollment. In one example, a computing environment can detect a network connection event where a client device establishes a connection with a network device that is communicatively coupled to the computing environment. A configuration file can be copied from a data store of the at least one computing device to local memory of the client device. The configuration file can comprise one or more predefined configuration settings. A configuration of the at least one client device can be caused using the configuration file. The configuration can include automating user interface events on the client device to cause a setting of the client device to conform to the predefined configuration settings.

20 Claims, 9 Drawing Sheets

(56) References Cited

U.S. PATENT DOCUMENTS

| | | | | |
|---|---|---|---|---|
| 2012/0126941 A1* | 5/2012 | Coggill | ............... | G06F 21/36 340/5.54 |
| 2012/0260683 A1* | 10/2012 | Cheon | ............... | F25D 29/00 62/125 |
| 2012/0296856 A1* | 11/2012 | Barkan | ............... | G06F 3/016 706/12 |
| 2013/0198309 A1* | 8/2013 | Muller | ............... | G06F 9/526 709/210 |
| 2014/0372981 A1* | 12/2014 | Said | ............... | G06F 9/44505 717/121 |
| 2015/0074609 A1* | 3/2015 | Lanzkron | ............ | G06F 3/04842 715/838 |
| 2016/0191308 A1* | 6/2016 | Berry | ............... | H04L 41/0806 709/221 |
| 2016/0371720 A1* | 12/2016 | McDonnell | ........ | G06Q 30/0242 |
| 2017/0193295 A1* | 7/2017 | Kim | ............... | G06K 9/00604 |

* cited by examiner

DIFFERENTIAL STAGING OF DEVICES IN BULK ENROLLMENT

RELATED APPLICATIONS

Benefit is claimed under 35 U.S.C. 119(a)-(d) to Foreign application Serial No. 4101/CHE/2015 filed in India entitled "DIFFERENTIAL STAGING OF DEVICES IN BULK ENROLLMENT", on Aug. 6, 2015, by AIRWATCH LLC, which is herein incorporated in its entirety by reference for all purposes.

BACKGROUND

Various enterprises and other organizations provide employees with devices that are preconfigured with certain settings or preloaded with particular applications and data. For example, an enterprise can provide its employees with a device having preloaded enterprise applications and enterprise data. As enterprises can have hundreds to thousands of devices to provide to employees, configuring and preloading these devices with certain data is a time-intensive process. Current methods require workers to manually install the data on these devices and manually configure the device with various settings before the device is provided to a respective employee.

In some situations, a device can be preconfigured or preloaded with certain data by the original equipment manufacturer (OEM) of the device. However, each device subject to this process would have the same applications, data, and settings. Moreover, having an OEM configure some devices is costly and complex.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
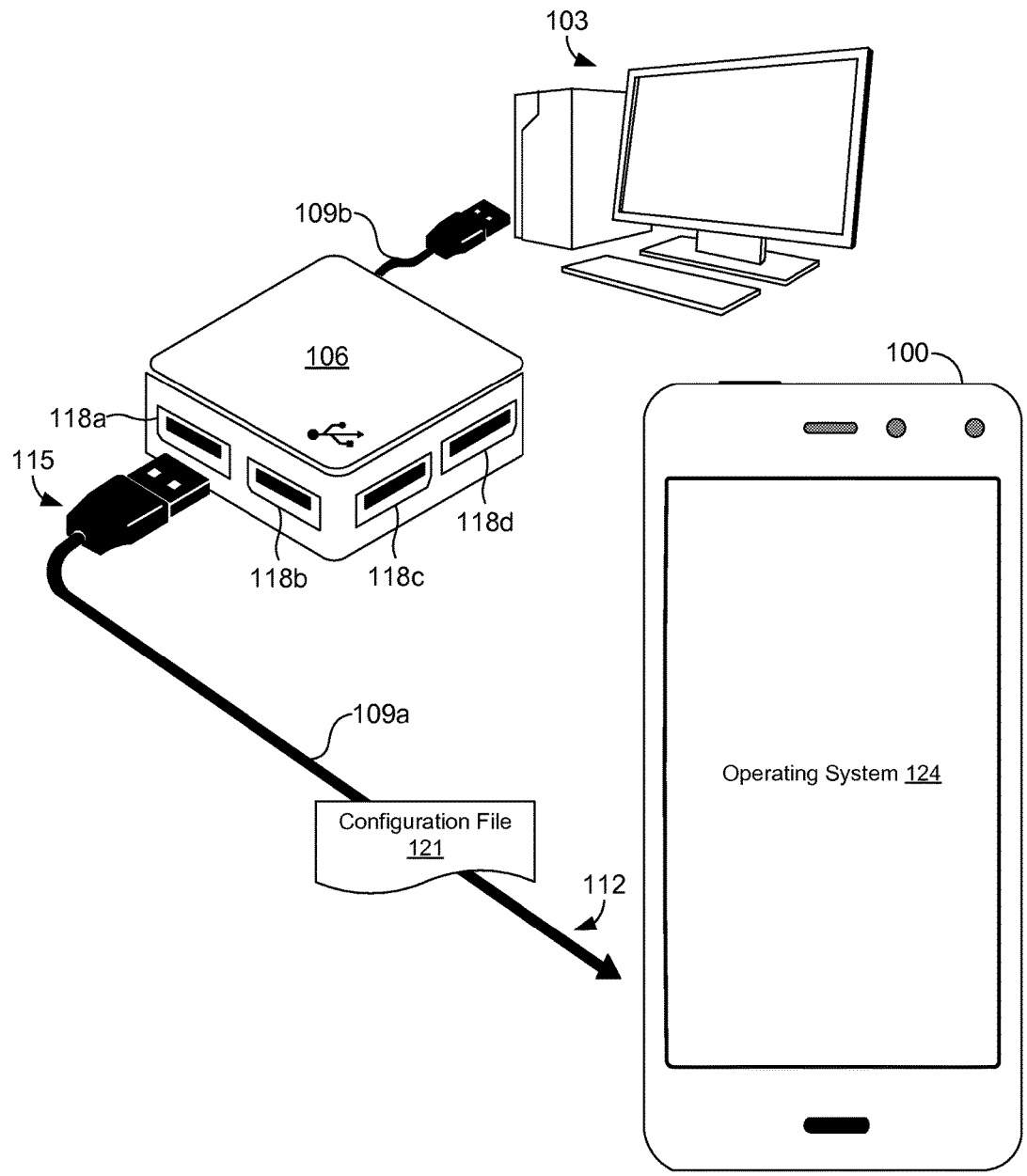
FIG. 1 is a drawing of an example system for differential staging of devices in bulk enrollment.

The present disclosure relates to differential staging of devices in bulk enrollment. Enterprises and organizations can provide employees with devices that are preconfigured with certain settings or preloaded with particular applications and data. For example, an enterprise can provide its employees with a device having preloaded enterprise applications and enterprise data. As enterprises can have hundreds to thousands of devices to provide to employees, configuring and preloading these devices with certain data is a time-intensive process. Current methods can require workers to manually install the data on these devices and manually configure the device to various settings before the device is provided to a user.

In some situations, a device can be preconfigured or preloaded with certain data by the original equipment manufacturer (OEM) of the device. However, each device subject to this process would have the same applications, data, and settings. Moreover, having an OEM configure some devices is costly and complex. Individual customization of devices is therefore problematic.

It can be beneficial for a computing environment to manage the bulk configuration of various devices. In one example, the computing environment can detect a network connection event where a client device establishes a connection with a network device. For example, the computing environment can detect when a client device is physically connected to a universal serial bus (USB) hub using a USB connector. In another example, the computing environment can detect when a client device is physically connected to an Ethernet switch or a router using a wired network connection. In yet another example, the computing environment can detect when a client device is wirelessly connected to a wireless access point (AP), a wireless router, or other suitable network device.

In response to detection of the network connection event, the computing environment can push a configuration file to the client device. The configuration file can include one or more configuration tasks to be performed on the client device 100 to configure the client device 100 according to predefined settings. In some examples, the configuration file includes an executable file that performs the configuration tasks, such as an EXE file, a JAVA) archive file (JAR), an application package file (APK), or a script (e.g., a shell script).

When received by the client device, the configuration file initiates configuration of the client device. For example, software and hardware settings of the client device can be modified to conform to the one or more configuration settings specified by the configuration file by performing various configuration tasks locally on the client device. In some examples, configuration can include simulating touch events on user interface objects rendered on the client device. In other examples, configuration can include modifying files or data associated with the settings of the software and hardware of the client device.

As a result, when organizations, such as enterprises, provide personnel with a client device, the personnel will no longer be required to perform a manual configuration of the device, for example, by having to connect to a network and download particular applications or files. This is beneficial when organizations have a significant pool of devices to provide to respective personnel.

With reference to FIG. 1, shown is an example of a client device 100 in data communication with a computing environment 103 over a network. In the example of FIG. 1, the client device 100 is connected to a USB hub device 106 using a first USB connector 109*a*. For example, a first end 112 of the first USB connector 109*a* can be connected to a port of the client device 100, such as a USB port or a micro-USB port. A second end 115 of the first USB connector 109*a* can connect to the USB hub device 106 through a respective one of USB ports 118*a* . . . 118*d*. Similarly, a second USB connector 109*b* can connect the USB hub device 106 to the computing environment 103 through a suitable port (not shown), thereby establishing a data connection between the computing environment 103 and the client device 100.

The computing environment 103 can include a processor-based system, such as a computer system. While depicted in FIG. 1 as a desktop computer, in other examples the computing environment 103 can include a server computer, a laptop computer, a tablet computer system, or a combination thereof. Similarly, the client device 100 can include a processor-based system, such as a smartphone. In other examples, the client device 100 can include a desktop computer, a laptop computer, a personal digital assistant, a cellular telephone, a set-top box, a music player, a tablet computer system, a game console, or an electronic book reader.

The computing environment 103 can include an application or service that detects a network connection (e.g., a USB connection) made between a client device 100 and the USB hub device 106. As a result of the connection, the computing environment 103 can identify the client device 100 using a client device identifier which can include a unique identifier, such as an OEM serial number, a device serial number, a media access control (MAC) address, or a digital fingerprint generated using hardware or software of the client device.

The client device identifier can be used to generate a customized configuration of the client device 100. In one example, the computing environment 103 can detect a network connection event where the client device establishes a USB connection with the USB hub device 106. The computing environment 103 can generate a custom configuration file 121 for the client device 100 based on, for example, a type of the client device 100 identified by the computing environment 100, the software and hardware capabilities of the client device 100, predefined enterprise settings, or other information. For example, software and hardware settings of the client device 100 can be modified to conform to one or more configuration settings.

When received by the client device 100, the configuration file 121 causes a configuration of the client device in accordance with the one or more configuration settings. Specifically, the configuration file 121 can designate configuration tasks to be performed on the client device 100. In some examples, the configuration file 121 includes developer commands capable of being performed by the Android Debug Bridge (adb) that allows communication between the computing environment 103 and an emulator instance or a connected client device 100 executing the ANDROID® operating system.

In some examples, the configuration file 121 includes an executable file, such as an EXE file, a JAR file, an APK file, or a script. In other examples, an operating system 124 of the client device 100 or a client application executing on the client device 100 can be configured to identify configuration tasks designated in the configuration file 121. The client application causes the configuration tasks to be performed in accordance with the settings.

In one example, configuration of the client device 100 can include automating user interface events (e.g., touch events) on the client device 100. For client devices 100 executing the ANDROID® operating system, the "UI Automator" application programming interface (API) can be employed by a client application or the configuration file 121 to simulate touch events on the client device 100, such as single presses, double presses, long presses, finger swipes, palm swipes, scrolls, or other gestures. Also, interactions with hardware components of the client device 100 can be simulated, such as pressing display buttons, home buttons, back buttons, camera capture buttons, and search buttons. To this end, various events capable of being performed physically by a user can be simulated on the client device 100 as if a user were performing equivalent operations. However, simulation of the touch events does not require a user for configuration of the client device 100.

The UI Automator library, or other library suitable for the operating system 124 of the client device 100, can be included within the configuration file 121 as it is communicated to the client device 100 from the computing environment 103. A user interface of an operating system 124 or an application executing on the client device 100 can be analyzed to identify objects shown in the user interface, such as form fields, menus, dialogs, graphics, icons, and buttons. The findObject( ) method set forth in the UI Automator library can be used to identify and retrieve data for objects shown in a given user interface. To perform tasks on the client device 100, various touch events can be simulated in association with the user interface objects.

The simulated touch events can be accomplished using UI Automator functions, such as click( ), that simulates a click on a center of an object in the user interface, dragTo( ), that drags an object to predefined coordinates, setText( ), that sets the text in a field of the user interface, clearTextField( ), that clears the existing text in a field, swipeUp( ), that performs a swipe up event in association with an object, swipeDown( ), that performs a swipe down event in association with an object, swipeLeft( ), that performs a swipe left event, in association with an object, and swipeRight( ), that performs a swipe right event in association with an object.

Figure 2:
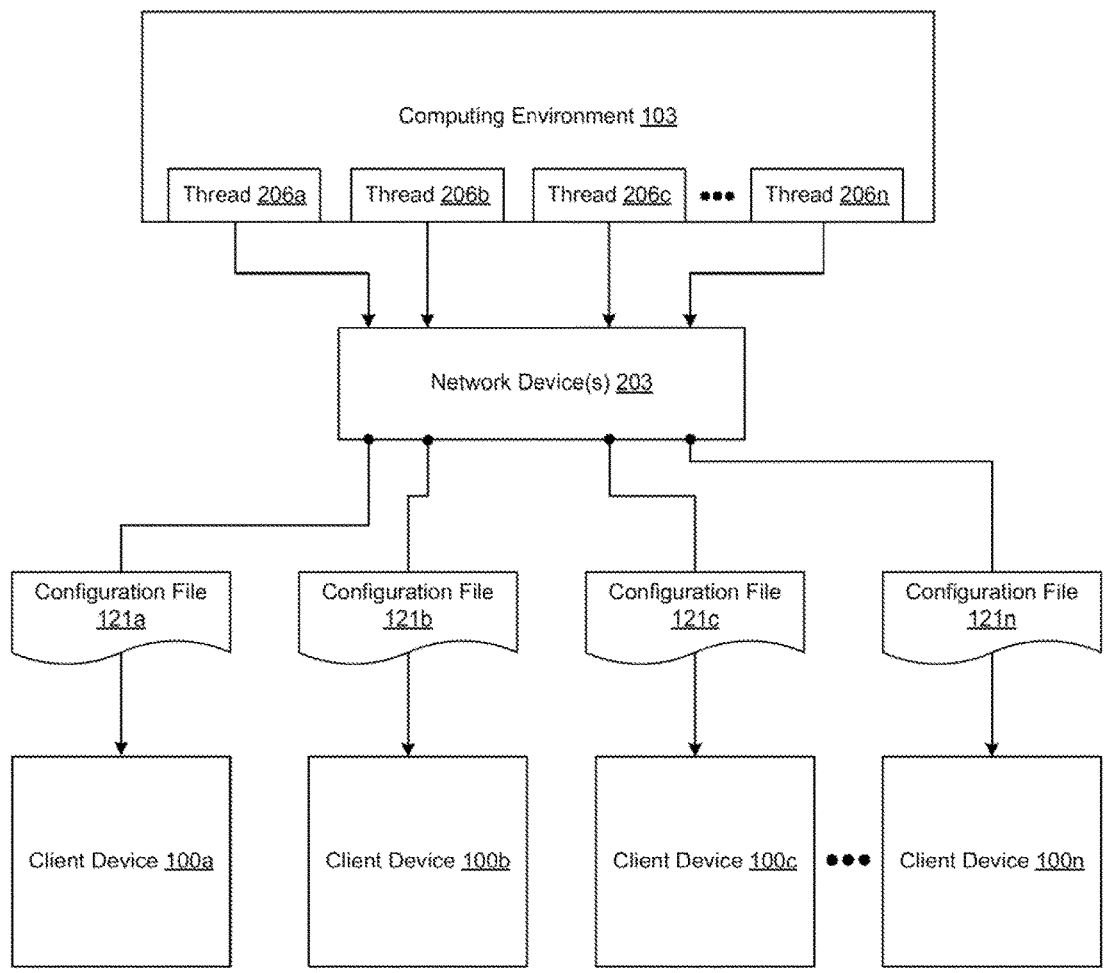
FIG. 2 is a drawing of a schematic diagram of the example system for differential staging of devices in bulk enrollment.

With reference to FIG. 2, shown is an example of a networked environment 200. The networked environment 200 can include the computing environment 103 and various client devices 100a . . . 100n in communication with one another through one or more network devices 203. The one or more network devices 203 can include a USB hub device 106, a FireWire hub, a router (e.g., a WiFi router), a network switch (e.g., an Ethernet switch), or other similar network device 203. The client devices 100 can connect to the network device 203 using a wired connection or, in some examples, wirelessly.

In some examples, the computing environment 103 can create a thread 206 for each of the client devices 100 as they connect to the one or more network devices 203. In other words, the computing environment 103 can manage various threads 206a . . . 206n, wherein each of the threads 206a . . . 206n handles the configuration of a respective one of the client devices 100a . . . 100n. In some examples, the threads 206 can be implemented as a thread or process of an operating system. In other examples, the threads 206 can be implemented as a thread or process of a client application. Operations in each of the threads 206 can be performed in parallel or sequentially. In a sequential operation of the threads 206, the operations can be performed in a first-in, first-out (FIFO) order, a last-in, first-out (LIFO) order, or other suitable order.

Each of the threads 206 can manage the configuration of a corresponding one of the various client devices 100. In some examples, the threads 206 can generate configuration files 121a . . . 121n for the client devices 100a . . . 100n and oversee the configuration of the client devices 100 according to a respective configuration file 121. After a successful configuration of a client device 100, the thread 206 can be terminated or used to configure a different client device 100.

As a new client device 100 is connected to the network device 203, the computing environment 103 can create a thread 206 to manage the configuration of the client device 100. In one example, the thread 206 creates a customized configuration file 121 for a respective client device 100 and communicates the configuration file 121 to the client device 100 through the network device 203. Communicating the configuration file 121 to the client device 100 can include mounting a drive of the client device 100 to become accessible to the computing environment 103 and copying the configuration file 121 to the mounted drive. In other examples, communicating the configuration file 121 to the client device 100 can include encoding the configuration file 121 in one or more data packets for communication over the network 302. Once received, the configuration file 121 causes a configuration process to be performed on the client device 100.

Configuration of the client device 100 can include simulating touch events on the client device 100. For example, the configuration file 121 (or a client application) can simulate touch events on the client device 100 to access and modify software and hardware settings on the client device 100. In one example, touch events are simulated that cause a settings dialog to be accessed that manages configuration of WiFi networks. In the dialog, suitable touch events can be simulated to provide a username and password in order to access a predefined WiFi network, such as an enterprise WiFi network. The predefined WiFi network, as well as a password for the WiFi network, can be set forth in the configuration file 121. As a result of the configuration process, a user of the client device 100 is not required to manually enter a password when entering a building having the enterprise WiFi network. Once configuration of the client device 100 has been completed, the thread can terminate or manage the configuration of a different client device 100.

In another example, touch events are simulated that cause the client device 100 to download and install applications from an application repository. For example, touch events can be simulated to perform a search for a particular application using a search feature of the application repository, download the application, and install the application. Further, the application can be executed on the client device 100 and can be configured in accordance with the configuration file 121.

In yet another example, touch events are simulated that cause the client device 100 to enroll the client device 100 with a management service, such as an enterprise management service. For example, touch events can be simulated to open an application and provide suitable credentials to enroll the client device 100 with the management service.

Figure 3:
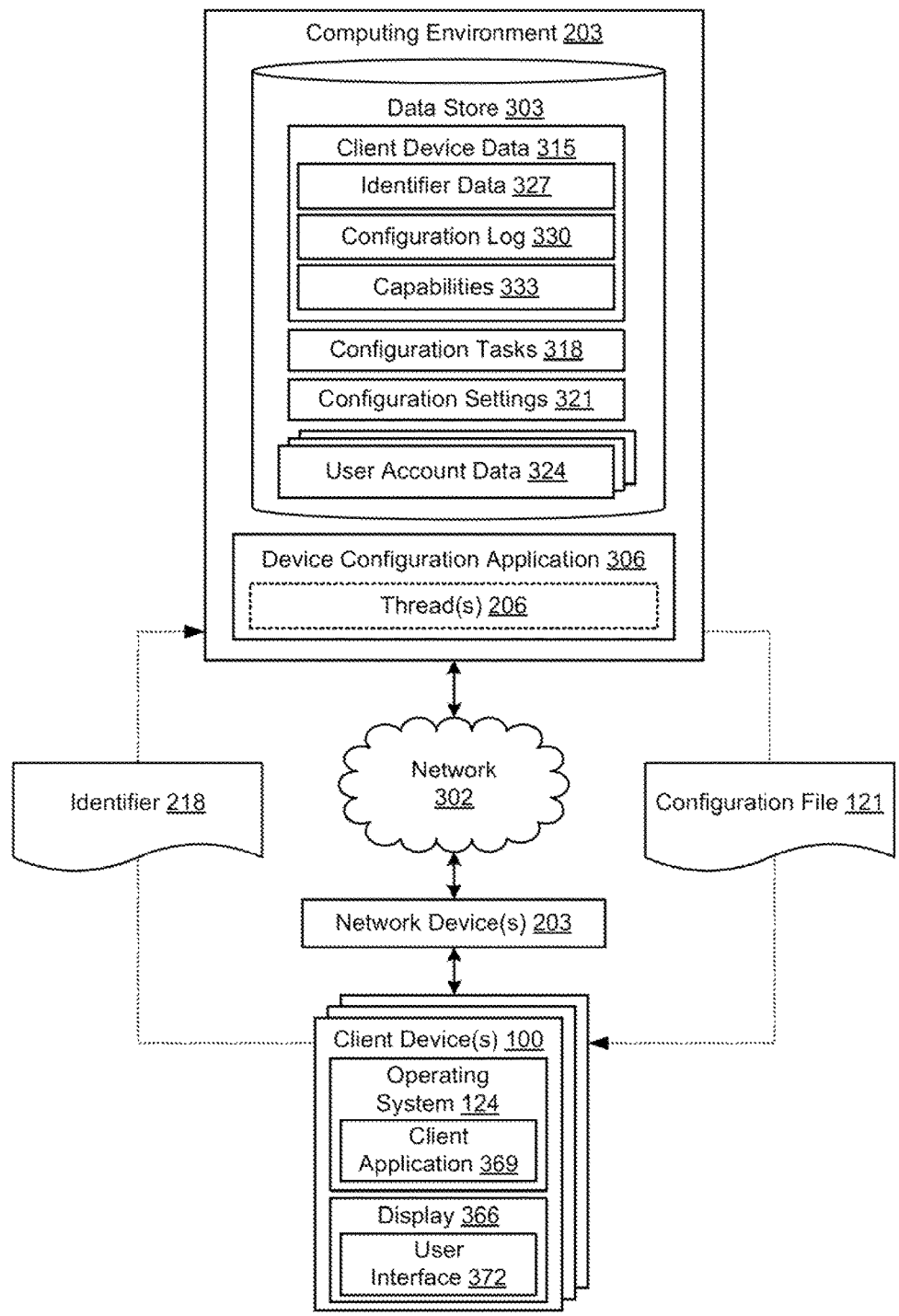
FIG. 3 is a drawing of an example of a networked environment including the example system for differential staging of devices in bulk enrollment.

With reference to FIG. 3, shown is another example of a networked environment 200. The networked environment 200 can include the computing environment 103 and the client device 100 in communication with one another over a network 302. The network 302 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, or telephony networks.

The computing environment 103 can include, for example, a server computer or any other system providing computing capability. Alternatively, the computing environment 103 can include a plurality of computing devices that are arranged, for example, in one or more server banks or computer banks. The computing environments 103 can include a grid computing resource or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above.

A data store 303 can include memory of the computing environment 103 or mass storage resources of the computing environment 103. The data stored in the data store 303, for example, can be associated with the operation of the various applications and functional entities described below.

The components executed on the computing environment 103 can include, for example, a device configuration application 306. The device configuration application 306 can oversee the configuration of client devices 100 that are connected to the network 302. To this end, the device configuration application 306 can create threads 206 for each of the client devices 100 connected to the network 302 through one or more network devices 203. A thread 206 can access or create a configuration file 121 for a client device 100, communicate the configuration file 121 to the client device 100 over the network 302, monitor and log the performance of configuration tasks on the client device 100, verify that the client device 100 has been configured in accordance with configuration settings, perform remedial operations, and maintaining a log file in the data store 303 describing how a client device 100 has been configured.

The data stored in the data store 303 can include, for example, client device data 315, configuration tasks 318, configuration settings 321, and user account data 324. The client device data 315 can include information associated with the configuration of the client devices 100, such as identifier data 327, configuration log 330, and capabilities 333. Identifier data 327 can include an identifier for a client device 100, such as an OEM serial number, a device serial number, a MAC address, or a digital fingerprint of the client device 100. The configuration log 330 can include a log file that includes a set of operations attempted, whether successfully or unsuccessfully, on the client device 100 during configuration of the client device 100. The capabilities 333 can include hardware and software capabilities of the client device 100. The capabilities 333 can be used in determining how a client device 100 is to be configured as well as generating a configuration file 121 for the client device 100.

Configuration tasks 318 can include tasks to be performed on the client device 100 to perform a particular configuration of a client device 100 according to configuration settings 321. To this end, configuration tasks 318 can be used by the device configuration application 306 to generate one or more configuration files 121. Configuration tasks 318 can be dependent on a type of the client device 100, capabilities 333 of the client device, or a role associated with an eventual user of the client device 100. In some examples, configuration tasks 318 and configuration settings 321 can be defined by an administrator of an enterprise to establish how client devices 100 distributed to employees should be initially configured. In other examples, configuration tasks 318 can be defined by a user (or an eventual user) of the client device 100.

User account data 324 can include information associated with one or more users, such as a username, a real name, an email address, an avatar or picture, preferences, and authentication data. In some examples, the device configuration application 306 can configure a client device 100 for a particular user account. For example, configuration of a client device 100 can include using the authentication data to access, install, or execute various enterprise applications. In other examples, the device configuration application 306 can configure a client device 100 for a generic user. For example, workers in a warehouse can share rugged devices between the various personnel to, for example, scan and ship items from the warehouse. The generic user may be one of many personnel in the warehouse.

The client device 100 can be representative of one or more client devices 100. The client device 100 can include a processor-based system, such as a computer system, that can include a desktop computer, a laptop computer, a personal digital assistant, a cellular telephone, a smartphone, a set-top box, a music player, a tablet computer system, a game console, or an electronic book reader. The client device 100 can include a display 366 that can be a liquid crystal display (LCD) or light emitting diode (LED) display. The display 366 can include a touch-screen display. The client device 100 can also be equipped with network interfaces, including a localized network interface, such as a near-field communication (NFC) interface or radio-frequency identification (RFID) interface.

The client device 100 can include an operating system 121 that executes various applications, such as client applications 369. The client applications 369 can access network content served up by the computing environment 103 or other servers. The client applications 369 can also render a user interface 372 on the display 366. In some examples, the client applications 369 can include a browser or a dedicated application, and the user interface 372 can include a network page, an application screen, or other interface. Further, the client applications 369 can include an application that configures the client device 100 by performing configuration tasks 318 set forth in the configuration file 121. In other examples, the configuration file 121 can be executable as its own client application 369. The client applications 369 can further include enterprise applications, social networking applications, word processors, spreadsheet applications, or media viewing applications.

Next, a general description of the operation of the various components of the networked environment 200 is provided. As many client devices 100 require configuration before being provided to eventual users of the client devices 100, the device configuration application 306 performs a differential staging of the client devices 100. In some examples, configuration of a client device 100 can commence when the client device 100 is connected to a suitable network device 203.

To begin, the computing environment 103 can be configured to detect network connection events where various client devices 100 establish a connection with one or more network device 203. In one example, the computing environment 103 can detect when a client device 100 is physically connected to a USB hub device 106 using a USB connector 109. In another example, the computing environment 103 can detect when a client device 100 is connected to an Ethernet switch or a router using a wired network connection. In yet another example, the computing environment 103 can detect when a client device is wirelessly connected to a wireless AP, a wireless router, or other suitable network device 203.

As many client devices 100 can require configuration, the computing environment 103 can be configured to handle parallel configuration operations. For example, the computing environment 103 can continue with a configuration of a first client device 100 while starting a configuration of a second client device 100 even though configuration of the first client device 100 may not be complete. To handle the parallel configuration operations, the device configuration application 306 can utilize threads or processes that are performed in parallel.

In one example, the device configuration application 306 can create a thread 206 for each client device 100 as they connect to the network device 203. The thread 206 can be implemented as a thread or process of an operating system of the computing environment 103 or an application, such as the device configuration application 306. As a thread 206 is created for each client device 100 as it connects to the network 302, the device configuration application 306 allows differential configuration of client devices 100. For example, configuration of a first client device 100 does not need to be completed before configuration of a second client device 100 commences.

Configuration tasks performed in a given thread 206 oversee the configuration of the client device 100. For example, in a thread 206 created for a particular client device 100, the device configuration application 306 can generate a configuration file 121 customized for the client device 100 and communicate the configuration file 121 to the client device 100 over the network 302.

In some examples, a configuration file 121 is generated that causes a configuration of the client device 100 by performing predefined configuration tasks 318. In one example, the configuration file 121 includes an executable file or a script that is generated to preform configuration tasks 318 on the client device 100. In another example, the configuration file 121 includes a list of configuration tasks 318 to be performed such that a suitable client application 369 can read the configuration file 121 and perform the configuration tasks 318.

Additionally, the configuration file 121 can be generated to perform simulated touch events to carry out performance of a given configuration task 318. In one example, a configuration task 318 includes executing a particular application on a client device 100 to configure the particular application. The configuration task 318 of executing an application can be performed by simulating a touch event in association with an icon for the application. As the application is executed, subsequent touch events can be simulated to configure the application in accordance with the configuration file 121.

In one example, credentials for an eventual user of the client device 100 can be generated by the device configuration application 306 and encoded into the configuration file 121 to log the user into the application and to save the credentials on the client device 100. Credentials can be generated dynamically by the device configuration application 306, for example, as the configuration file 121 is generated. In some examples, the credentials include a username, an email address, or a password. The username can be generated according to a predefined format, such as first initial and a last name of the user. The email address can be an existing email address of the user or can be generated according to a predefined format, such as first name, a symbol, and a last name of a user. Similarly, the password can be generated according to a predefined format, such as a last name and the last four digits of the social security number of the user. In other examples, the username, the email address, and the password can be generated pseudo-randomly.

Configuration tasks 318 can include tasks that configure hardware or software settings, such as battery consumption settings, display settings, communication module settings (e.g., WiFi or BLUETOOTH® settings), and application settings. In one example, configuration tasks 318 can include causing a download, installation, execution, and configuration of an application from an application store, such as an enterprise application. In another example, configuration tasks 318 can include causing authentication data or network setting data to be provided for certain WiFi networks. In yet another example, configuration tasks 318 can include configuring the client device 100 according to a role of an eventual user of the client device 100 and a user group of the eventual user.

As the device configuration application 306 oversees parallel configuration operations, the device configuration application 306 can continue to monitor new network connection events where client devices 100 have been connected to the network devices 203. New threads 206 can be created for the newly connected client devices 100 and the configuration of the newly connected client devices 100 can continue until completion.

Each thread 206 can verify that the client device 100 has been configured in accordance with the configuration file 121, perform remedial operations for unsuccessful configurations, and maintain the configuration log 330 describing how the client device 100 has been configured. In some examples, the thread 206 can identify crash events that occur on the client device 100 during its configuration. Crash events can include unsuccessful attempts to perform touch events, copy or modify data, execute applications, install applications, or connect to a network.

If the configuration of a particular client device 100 is complete, the corresponding thread 206 can be terminated. The configuration log 330 can include information associated with the configuration of the client device 100 and can be stored in the data store 303 to identify how a client device 100 was configured at a later time. In one example, the configuration log comprises entries in a database. Each entry can include a device identifier (e.g., OEM serial number, device serial number, or MAC address), a configuration log 330 for the client device 100, and user credentials generated or accessed for the eventual user of the client device 100. In some examples, the configuration file 121 used to configure the client device 100 can be stored in the data store 303 for future retrieval and access.

Figure 4A:
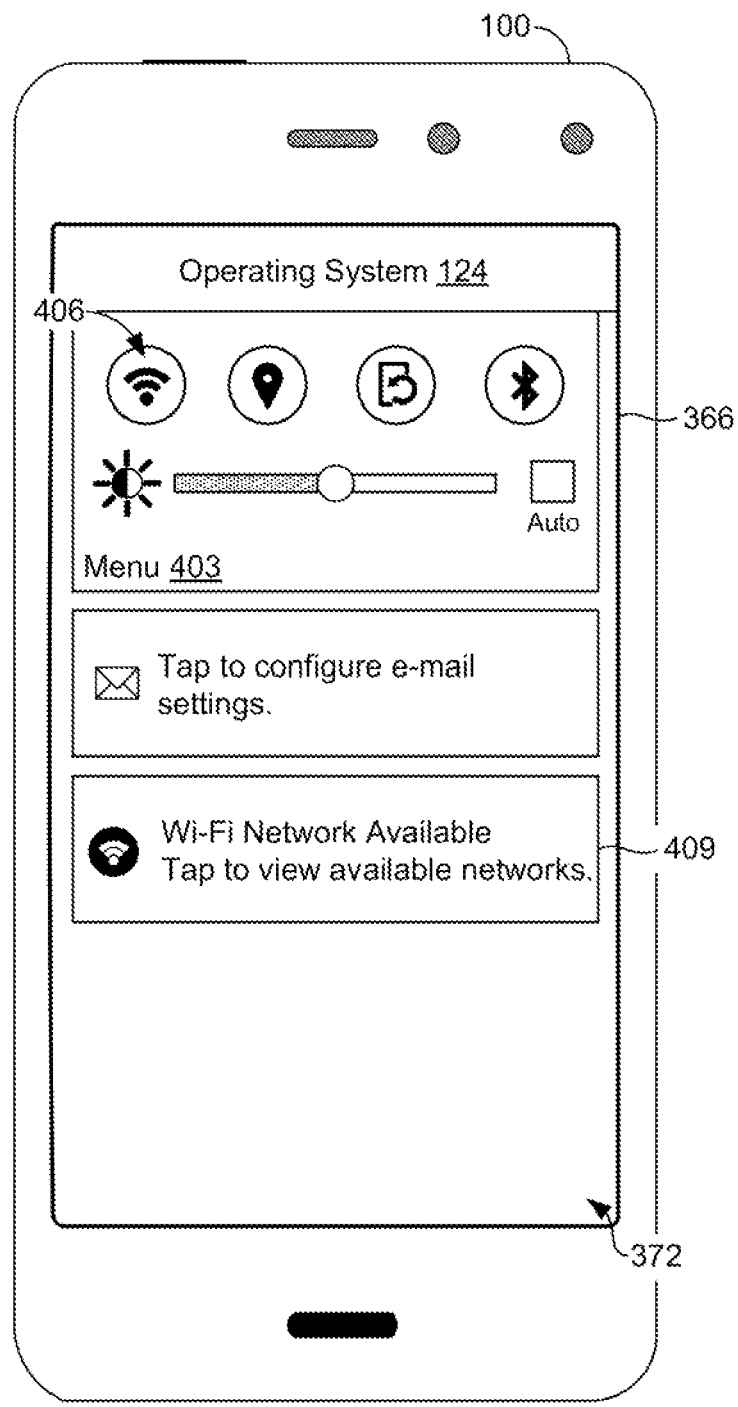
FIGS. 4A-4D are drawings of examples of user interfaces rendered on a display of a client device during a configuration of the client device.

Moving on to FIG. 4A, shown is a client device 100 rendering a user interface 372 according to various examples. Configuration of the client device 100 can include automating touch events on the client device 100 in association with user interface objects, such as text fields, menus, dialogs, graphics, icons, and buttons. The simulated touch events performed on the client device 100 can be defined as configuration tasks 318. In the example of FIG. 4A, WiFi on the client device 100 can be enabled on the client device 100 using simulated touch events. For example, a menu 403 including an icon 406 for WiFi can be accessed by simulating a down swipe in a top portion of the user interface 372. In some examples, a WiFi settings dialog can be accessed by simulating a touch event in association with the icon 406 for WiFi. In other examples, a WiFi settings dialog can be accessed by simulating a touch event in association with a WiFi settings component 409.

Figure 4B:
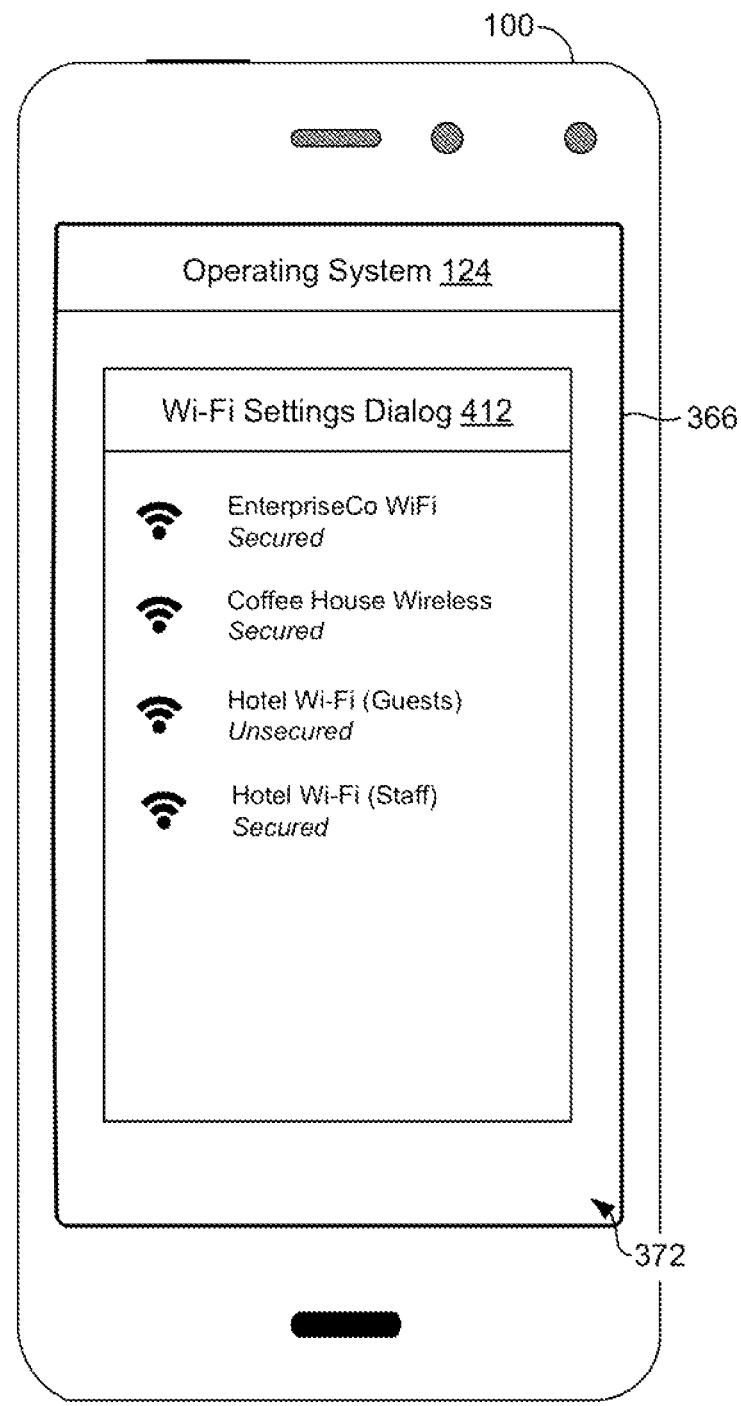

In FIG. 4B, the operating system 124 can cause a rendering of a WiFi settings dialog 412 in response to, for example, simulating a touch event in association with the icon 406 for WiFi or the WiFi settings components 409. The automated configuration of the client device 100 can include accessing the WiFi settings dialog 412 to configure the device to connect to a particular wireless network. In other examples, the WiFi settings dialog 412 can be accessed to input the wireless network settings in suitable fields of the WiFi settings dialog 412.

Figure 4C:
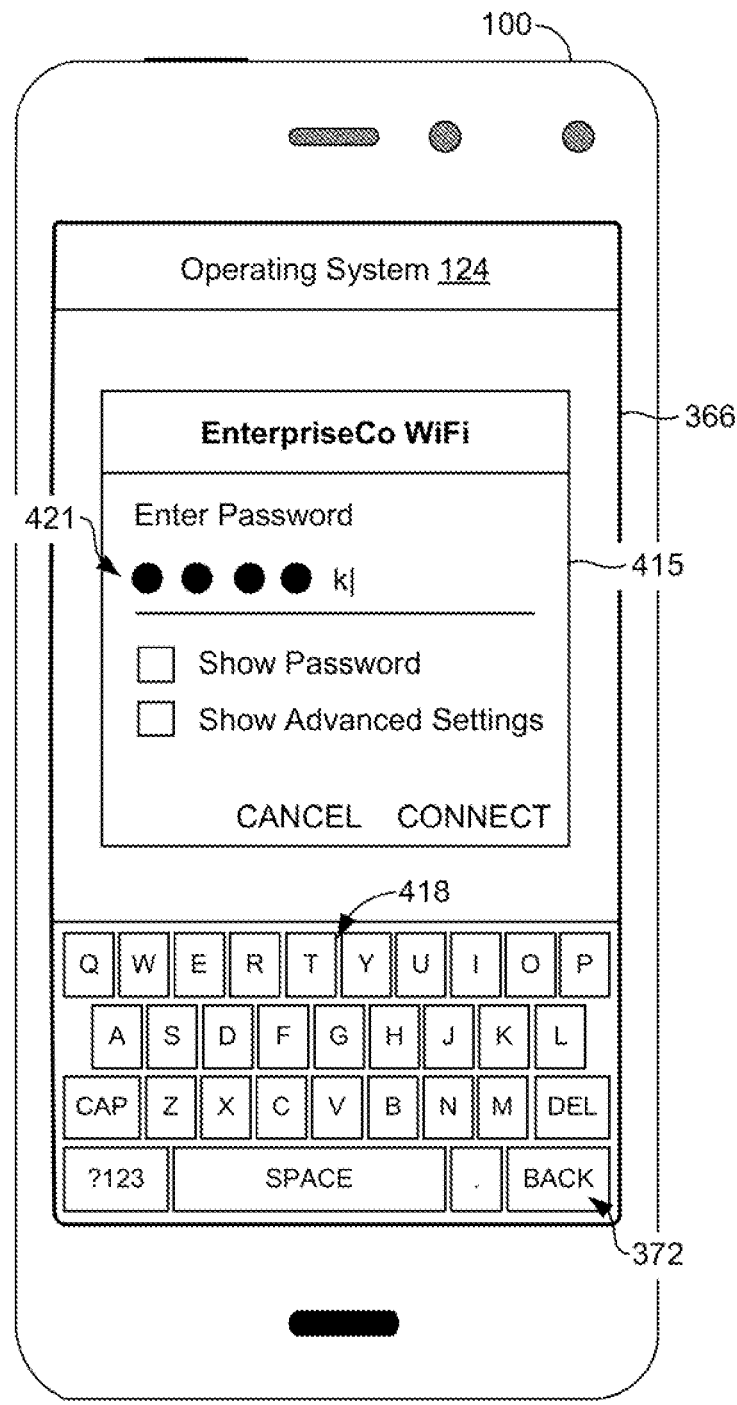

In the example of FIG. 4C, a simulated touch event can be performed on a field of a wireless network dialog 415 to bring up a virtual keyboard 418 of the operating system 124 of the client device 100. Simulated touch events in appropriate areas of the keyboard, such as in the center of the keys for alphanumeric characters, can be performed to input wireless network settings into a password field 421 of the wireless network dialog 415.

Figure 4D:
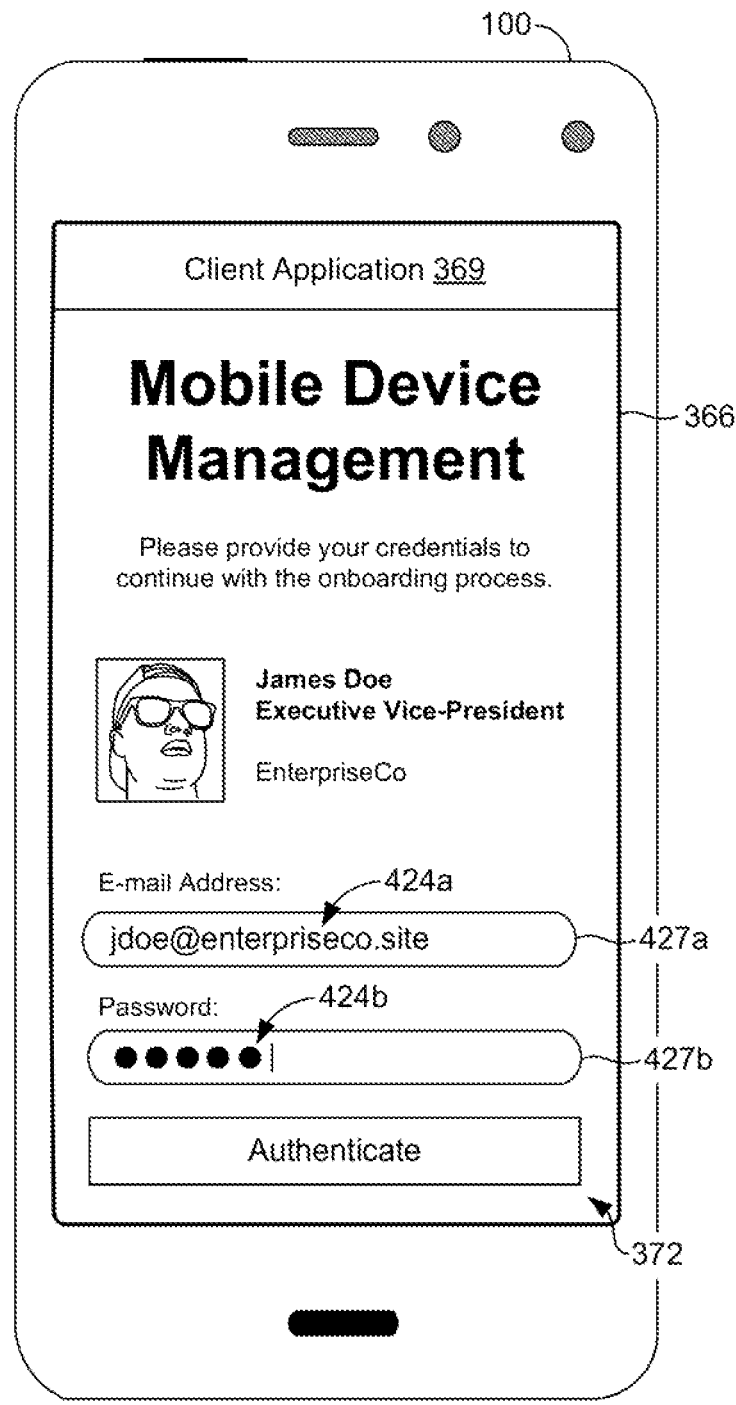

Turning now to FIG. 4D, simulated touch events can be performed to install and execute a client application 369 on the client device 100, for example, to enroll the client device 100 with a management service. The client application 369 can include, for example, an enterprise application, such as a mobile device management application. Further, simulated touch events can be performed to configure the client application 369. Execution of the application can be performed by simulating a touch event in an area of an icon for the client application 369. While the client application 369 is executing, subsequent touch events can be simulated to configure the client application 369 in accordance with the configuration file 121. In one example, credentials 424a . . . 424b, such as a username and password, for an eventual user of the client device 100 can be provided in the application forms 427a . . . 427b to log the user into the client application 369 and to save the credentials 424a . . . 424b on the client device 100.

In some examples, logging in on the client application 369 can cause the computing environment 103 to generate and send an email including the credentials to an eventual user of the client device 100. In some examples, the credentials can be generated dynamically by the computing environment 103, for example, as the configuration file 121 is generated. In other examples, the credentials can be generated dynamically by the client application 369 or the configuration file 121.

Figure 5:
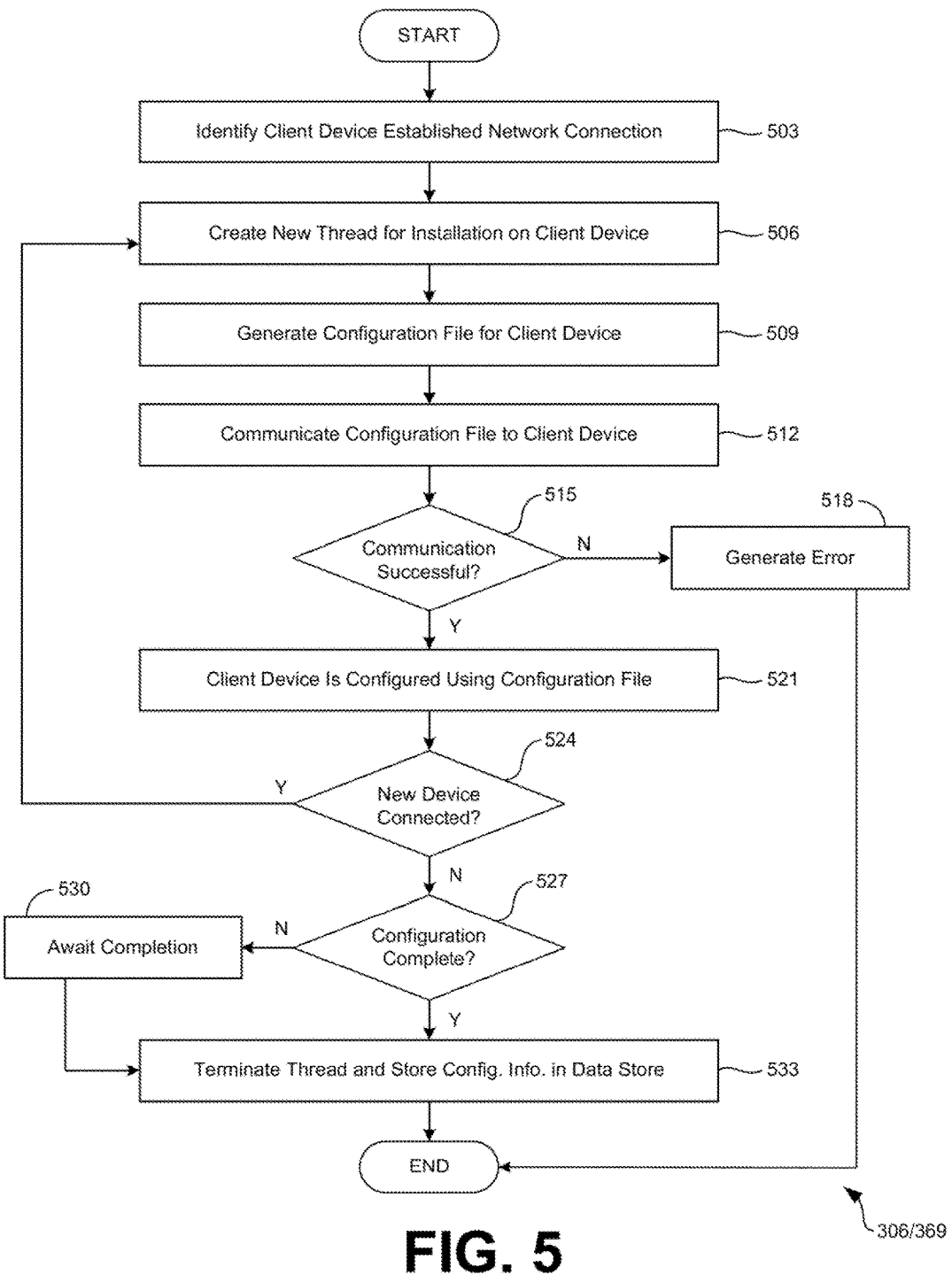
FIG. 5 is a flowchart illustrating an example of functionality implemented by components that can be executed in the networked environment of FIG. 3.

Referring next to FIG. 5, shown is a flowchart that provides one example of the operation of a portion of the networked environment 200. As an alternative, the flowchart of FIG. 5 can be viewed as depicting an example of steps of a method implemented by the device configuration application 306 or the client application 369. The separation or segmentation of functionality as discussed herein is presented for illustrative purposes only.

To manage the bulk configuration of client devices 100, in step 503, the computing environment 103 can detect network connection events where client devices 100 establish a connection with a network device 203. In one example, the computing environment 103 can detect when a client device 100 is physically connected to the USB hub device 106 using a USB connector 109. In another example, the computing environment 103 can detect when a client device 100 is connected to an Ethernet switch or a router using a wired network connection. In yet another example, the computing environment 103 can detect when a client device is wirelessly connected to a wireless AP, a wireless router, or other suitable network device 203.

In step 506, the computing environment 103 can create a thread 206 for the client device 100 as they connect to the network device 203. In some examples, the thread 206 can be implemented as a process of an operating system or an application, such as the device configuration application 306. As a thread 206 is created for each client device 100 as it connects to the network 302, the device configuration application 306 allows differential configuration of client devices 100. For example, configuration of a first client device 100 does not need to be completed before configuration of a second client device 100 commences.

As noted above, operations performed in a given thread 206 oversee the configuration of the client device 100. For example, in step 509, the thread 206 can generate a configuration file 121 for a client device 100 and, in step 512, communicate the configuration file 121 to the client device 100 over the network 302. The thread 206 can generate the configuration file 121 to perform predefined configuration tasks 318, such as tasks set forth by administrators of an enterprise. Configuration tasks 318 can include modifying hardware or software settings of the client device 100, such as battery consumption settings, display settings, communication module settings (e.g., WiFi or BLUETOOTH settings), and application settings. In one example, configuration tasks 318 can include downloading, installing, executing, and configuring an application accessed from an application store, such as an enterprise application. In another example, configuration tasks 318 can include causing authentication data or network setting data to be provided for certain WiFi networks. In yet another example, configuration tasks 318 can include configuring the client device 100 according to a role of an eventual user of the client device 100 or a user group of the eventual user.

In step 515, a determination can be made whether the communication of the configuration file 121 to the client device 100 was performed successfully. If the communication was not performed successfully, the process can proceed to step 518 to generate a suitable error that can notify an administrator of the device configuration application 306. Thereafter, the process can terminate. If, however, the configuration file 121 is communicated to the client device 100 successfully, the process can proceed to step 521.

In step 521, receipt of the configuration file 121 by the client device 100 causes a configuration of the client device 100 using, for example, the configuration file 121. Configuration can include performing configuration tasks 318 locally on the client device 100, for example, by simulating touch events on the client device 100.

As the device configuration application 306 can handle parallel operations, in step 524, it can be determined whether a new client device 100 has been connected to the network 302. If so, the process can revert to step 506 where a new thread 206 is created for the newly connected client device 100 and the configuration of the newly connected client device 100 can continue until completion when a termination signal is detected. If not, the process can proceed to step 527 where a determination can be made whether the configuration of the client device 100 is complete. If the configuration of the client device 100 has not been completed, the process can continue to step 530 to await completion.

Further, the thread 206 can verify that the client device 100 has been configured in accordance with the configuration file 121, perform remedial operations for unsuccessful configurations, store an entry in the data store 303 relating to how the client device 100 has been configured, or other suitable functions. If the configuration of a client device 100 is complete, the process can continue to step 533 to terminate the thread 206. In some examples, the client device 100 can be configured to render a visual indication on the client device 100 to indicate that configuration of the client device 100 is complete. In other examples, the client device 100 can be configured to play a visual indication, such as an audio file, on the client device 100 to indicate that the configuration is complete.

Further, in step 533, information associated with the configuration of the client device 100 can be stored in the data store 303 to identify how a client device 100 was configured at a later time. In one example, an entry of a database is added that includes the device identifier (e.g., OEM serial number, device serial number, or MAC address) and a log of the configuration of the client device 100. In some examples, the configuration file used to configure the client device 100 can be stored in the data store 303 for future retrieval and access.

Figure 6:
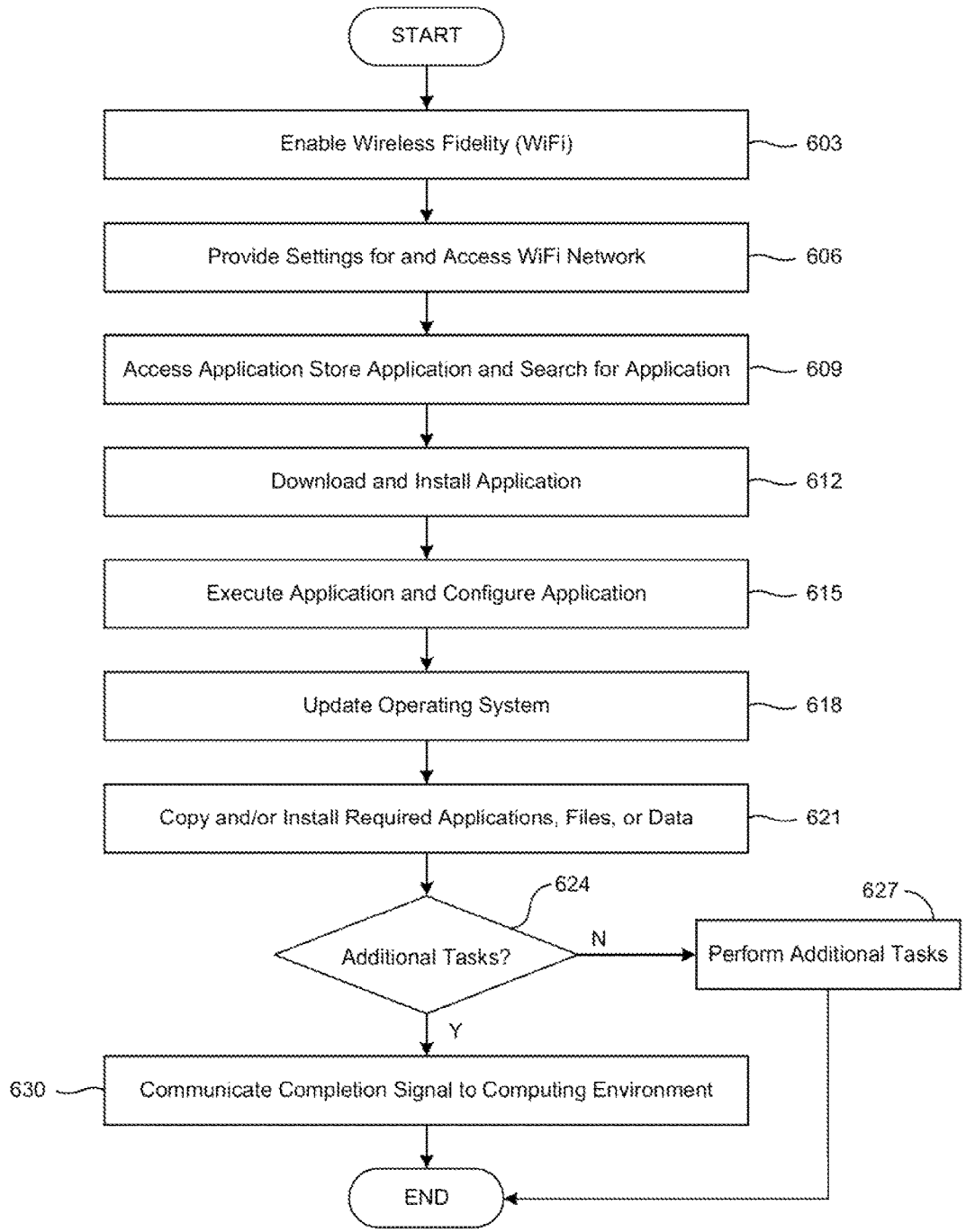
FIG. 6 is a flowchart illustrating an example of functionality implemented by components that can be executed in the networked environment of FIG. 3.

Referring next to FIG. 6, shown is a flowchart that provides one example of the configuration of a client device 100. As an alternative, the flowchart of FIG. 6 can be viewed as depicting an example of elements of a method implemented by the configuration file 121 or the client application 369. The separation or segmentation of functionality as discussed herein is presented for illustrative purposes only.

As noted above, configuration of the client device 100 can include automating user interface events (e.g., touch events) on the client device 100 or modifying files or data associated with the settings of the software and hardware of the client device 100. Starting with step 603, WiFi on the client device 100 can be enabled on the client device 100. For example, a menu including an icon for WiFi can be selected by simulating a touch event in an area of the icon for WiFi. In another example, a device driver can be utilized to activate a WiFi module of the client device 100.

Next, in step 606, wireless network settings can be provided. For example, a dialog can be accessed where wireless network settings are generally input by a user of the client device 100. The automated configuration can access wireless network settings set forth in the configuration file 121 and input the wireless network settings in suitable fields of the dialog. In one example, a touch event can be performed on a field of the dialog to bring up a virtual keyboard of the operating system 124 of the client device 100. Touch events in appropriate areas of the keyboard can be performed to input the wireless network settings into the appropriate fields of the dialog.

In some examples, configuration of the client device 100 includes verifying that certain applications are installed or configured on the client device 100. For example, an enterprise can require employees of the enterprise to have enterprise applications installed and configured on the client device 100. In step 609, configuration of the client device 100 can include accessing an application store to download one or more applications. In one example, a touch event can be performed on an icon for the application store to execute the application store. Subsequent touch events can be performed on a search field to access a virtual keyboard, provide a query to search for a particular application, access a search result for the particular application and download the application. Further, in step 612, the downloaded application can be installed on the client device 100.

In other examples, the one or more applications to be installed on the client device 100 can be bundled in the delivery of the configuration file 121 to the client device 100 or can be subsequently accessed from memory of the computing environment 103. This can include, for example, mounting a drive of the client device 100 to become accessible to the computing environment 103 and copying the application from the data store 303 to memory of the client device 100 (e.g., local memory or a secure digital (SD) card). Touch events can be simulated on the client device 100 to access the application from the local memory for installation or execution of the application.

Next, in step 615, the application installed on the client device 100 can be executed for configuration. Execution of the application can be performed by simulating a touch event in an area of an icon for the application. As the application is executed, subsequent touch events can be simulated to configure the application in accordance with the configuration file 121. In one example, credentials for a user of the client device 100 (e.g., accessed from the data store 303 and included in the configuration file 121) can be provided to log the user into the application and to save the credential on the client device 100.

In some examples, a device management service, such as a mobile device management service, can remotely configure the client device 100 once a particular client application 369 has been installed on the client device 100 and enrolled with the device management service. Accordingly, simulation of touch events can be limited to connecting the client device 100 to a network 302, such as a WiFi network, downloading and installing the client application 369, and enrolling the client application 369 with the device management service. Thereafter, the device management service can assume the remote configuration of the client device 100 by modifying settings or applications on the client device 100.

In some examples, a successful logging in on the application can cause the computing environment 103 to generate and send an email including the credentials to an eventual user of the client device 100. The credentials can be generated dynamically by the computing environment 103, for example, as the configuration file 121 is generated. In some examples, the credentials include a username, an email address, or a password. The username can be generated according to a predefined format, such as first initial and a last name of the user. The email address can be an existing email address of the user or can be generated according to a predefined format, such as first name, a symbol, and a last name of a user. Similarly, the password can be generated according to a predefined format, such as a last name and the last four digits of the social security number of the user. In other examples, the password can be generated pseudo-randomly.

Further, in step 618, the operating system 124 can be updated, for example, to download and install new patches or new versions of the operating system 124. Suitable touch events can be performed to access, for example, an update menu of the operating system 124 and to initiate an update of the operating system 124. This can provide additional security to the client device 100 as the configuration of the client device 100 can ensure that the client device 100 has a secure version of an operating system 124. In some examples, this can be performed at a beginning of the configuration process before subsequent configurations are performed.

In step 621, any additional applications can be copied, downloaded, and installed. Additionally, any other files or data designated in the configuration file 121 can be copied and downloaded to the client device 100, if not bundled in the transmission of the configuration file 121. The files or data can include, for example, enterprise files or data, such as files an enterprise requires employees to maintain on their client device 100.

In step 624, it can be determined whether additional tasks are required to configure the client device 100. If so, the additional tasks can be performed in step 627. If no additional tasks are required to be performed, the process can proceed to step 630 where a completion signal can be generated and communicated to the computing environment 103, for example, that causes the thread 206 for configuration of the client device 100 to terminate. A completion event can be detected by the computing environment 103 such that the computing environment 103 recognizes that configuration of the client device 100 is complete. In some examples, the completion event can include detecting the completion signal. In other examples, the completion event can include detecting that a final configuration task has been performed on the client device 100. In some examples, the completion event can include analyzing the hardware or software settings of the client device 100 to determine whether the client device 100 has been fully configured.

Further, the tasks performed during the configuration of the client device 100 can be maintained in a configuration log 330 to be communicated to the computing environment 103. The log can identify whether successful configuration operations were completed. In other examples, signals are generated by the client device 100 at the completion of each task and communicated to the computing environment 103 such that the computing environment 103 can maintain a log of the configuration of the client device 100.

The flowcharts of FIGS. 5 and 6 show examples of the functionality and operation of implementations of components described herein. The components of the networked environment 200 described herein can be embodied in hardware, software, or a combination of hardware and software. If embodied in software, each step in the flowcharts of FIGS. 5 and 6 can represent a module or a portion of code that comprises computer instructions to implement the specified logical functions. The computer instructions can be embodied in the form of source code that comprises human-readable statements written in a programming language or machine code that comprises machine instructions recognizable by a suitable execution system, such as a processor in a computer system or other system. If embodied in hardware, each step can represent a circuit or a number of interconnected circuits that implement the specified logical functions.

Although the flowcharts show a specific order of execution, it is understood that the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid. All such variations are within the scope of the present disclosure.

The computing environment 103, client device 100, and other components described herein can each include at least one processing circuit. Such a processing circuit can comprise one or more processors and one or more storage devices that are coupled to a local interface. The local interface can comprise a data bus with an accompanying address/control bus.

A storage device for a processing circuit can store data and components that are executable by the one or more processors of the processing circuit. In some examples, the device configuration application 306 can be stored in one or more storage devices and be executable by one or more processors. Also, the data store 303 can be located in the one or more storage devices.

The device configuration application 306 and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, one or more microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software or computer instructions for use by or in connection with the instruction execution system.

A computer-readable medium can include a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

The invention claimed is:

1. A non-transitory computer-readable medium embodying program instructions executable in at least one computing device comprising at least one hardware processor that, when executed by the at least one computing device, cause the at least one computing device to:

detect a network connection event in which a client device establishes a connection with a network device, wherein the at least one computing device is communicatively coupled to the network device;

in response to the client device establishing the connection with the network device, create a thread for a configuration of the client device, wherein the thread is processed by the at least one computing device in parallel with a plurality of other threads created for configuration for a plurality of other devices;

generate, in the thread, a configuration file for the client device that comprises a library of touch events, the library being determined based at least in part on an operating system of the client device, wherein the configuration file comprises executable code operable to call the library to simulate at least one user interface touch event in a user interface shown on the client device to configure the client device in accordance with at least one predefined configuration setting specified in the configuration file;

copy, in the thread, the configuration file from a data store of the at least one computing device to local memory of the client device;

initiate, in the thread, a configuration of the client device by executing the executable code of the configuration file on the client device; and in response to the configuration of the client device being successfully completed, terminate execution of the thread on the at least one computing device.

2. The non-transitory computer-readable medium of claim 1, wherein the configuration file is generated based at least in part on an identifier associated with the client device as the thread is processed by the at least one computing device.

3. The non-transitory computer-readable medium of claim 1, wherein the configuration file further comprises a JAVA archive (JAR) package file and the configuration of the client device further comprises an execution of the JAR package file on the client device.

4. The non-transitory computer-readable medium of claim 1, wherein the configuration of the client device further comprises automating the at least one user interface touch event in association with the operating system of the client device to cause the at least one setting of the client device to conform to the predefined configuration setting set forth by the configuration file.

5. The non-transitory computer-readable medium of claim 1, wherein the network connection event further comprises at least one of: a wired connection of the client device to a hub device or a wireless connection of the client device to a wireless network.

6. The non-transitory computer-readable medium of claim 5, the hub device further comprises a universal serial bus (USB) hub device, a FireWire hub device, a router device, or a network switch device.

7. The non-transitory computer-readable medium of claim 1, wherein copying the configuration file from the data store of the at least one computing device to local memory of the client device further comprises:

mounting a drive of the client device to become accessible to the at least one computing device; and copying the configuration file to the drive of the client device.

8. A computer-implemented method, comprising:

detecting a network connection event in which at least one client device establishes a connection with a network device that is communicatively coupled to at least one computing device;

in response to the at least one client device establishing the connection with the network device, creating a thread for a configuration of the at least one client device, wherein the thread is processed by the at least one computing device in parallel with a plurality of other threads created for configuration for a plurality of other devices;

generating, in the thread, a configuration file for the at least one client device that comprises a library of touch events, the library being determined based at least in part on an operating system of the at least one client device, wherein the configuration file comprises executable code operable to call the library to simulate at least one user interface touch event in a user interface shown on the at least one client device to configure the at least one client device in accordance with at least one predefined configuration setting specified in the configuration file;

copying, in the thread, the configuration file from a data store of the at least one computing device to local memory of the at least one client device;

initiating, in the thread, a configuration of the at least one client device by executing the executable code on the at least one client device; and in response to the configuration of the at least one client device being successfully completed, terminating execution of the thread on the at least one computing device.

9. The computer-implemented method of claim 8, further comprises:

maintaining a log file on the at least one client device that comprises a list of operations performed during the configuration of the at least one client device; and identifying a crash event in the log file that caused an unsuccessful configuration of the at least one client device.

10. The computer-implemented method of claim 8, further comprises:

identifying a type of the at least one client device using an identifier of the at least one client device detected by the at least one computing device; and selecting the configuration file copied to the client device based at least in part on the type of the at least one client device and the operating system of the at least one client device.

11. The computer-implemented method of claim 8, wherein:

the at least one client device comprises a plurality of client devices; and the thread is one of a plurality of threads.

12. The computer-implemented method of claim 8, wherein the configuration file further comprises a JAVA archive (JAR) package file and the configuration of the at least one client device further comprises an execution of the JAR package file on the at least one client device.

13. The computer-implemented method of claim 12, wherein the configuration of the at least one client device further comprises automating the at least one user interface touch event in association with the operating system of the at least one client device to cause the at least one setting of the at least one client device to conform to the predefined configuration setting set forth by the configuration file.

14. A system, comprising:

at least one computing device configured for data communication with a client device over a network; and program code executable by the at least one computing device that, when executed by the at least one computing device, causes the at least one computing device to:

detect a network connection event in which a client device establishes a connection with a network device, wherein the at least one computing device is communicatively coupled to the network device;

in response to the at least one of the client device establishing the connection with the network device, create a thread for a configuration of the client device, wherein the thread is processed by the at least one computing device in parallel with a plurality of other threads created for configuration for a plurality of other devices;

generate, in the thread, a configuration file for the client device that comprises a library of touch events, the library being determined based at least in part on an operating system of the client device, wherein the configuration file comprises executable code operable to call the library to simulate at least one user interface touch event to configure the client device in accordance with at least one predefined configuration setting specified in the configuration file;

copy, in the thread, the configuration file from a data store of the at least one computing device to local memory of the client device;

initiate, in the thread, a configuration of the client device by executing the executable code on the client device; and in response to the configuration of the client device being successfully completed, terminate execution of the thread on the at least one computing device.

15. The system of claim 14, wherein the configuration file is generated based at least in part on an identifier associated with the client device as the thread is processed by the at least one computing device.

16. The system of claim 14, wherein the configuration file further comprises a JAVA archive (JAR) package file and the configuration of the client device further comprises an execution of the JAR package file on the client device.

17. The system of claim 14, wherein the configuration of the client device further comprises automating the at least one user interface touch event in association with the operating system of the client device to cause the at least one setting of the client device to conform to the predefined configuration setting set forth by the configuration file.

18. The system of claim 14, wherein the network connection event further comprises at least one of: a wired connection of the client device to a hub device or a wireless connection of the client device to a wireless network.

19. The system of claim 18, the hub device further comprises a universal serial bus (USB) hub device, a FireWire hub device, a router device, or a network switch device.

20. The non-transitory computer-readable medium of claim 1, wherein the at least one user interface touch event is simulated on the client device to:

access a menu having an icon that, when manipulated, generates at least one user interface that receives a plurality of wireless network settings;

provide the plurality of wireless network settings in the at least one user interface;

cause the client device to connect to a wireless network separate from a network between the at least one computing device and the client device; and provide at least one credential to enroll the client device with a management service configured to oversee operation of the client device, wherein the management service performs at least one remote configuration of the client device over the wireless network.

* * * * *